United States Patent
Wieser

(10) Patent No.: US 7,782,183 B2
(45) Date of Patent: Aug. 24, 2010

(54) SYSTEM, DATA CARRIERS, READER AND METHOD FOR DETERMINING THE PERIPHERAL WHEEL SPEED AND DISTANCE

(75) Inventor: Stefan Wieser, Gerasdorf (AT)

(73) Assignee: NXP B.V., Eindhoven (NL)

( * ) Notice: Subject to any disclaimer, the term of this patent is extended or adjusted under 35 U.S.C. 154(b) by 369 days.

(21) Appl. No.: 11/721,040

(22) PCT Filed: Nov. 30, 2005

(86) PCT No.: PCT/IB2005/053967
§ 371 (c)(1),
(2), (4) Date: Jul. 31, 2007

(87) PCT Pub. No.: WO2006/061737
PCT Pub. Date: Jun. 15, 2006

(65) Prior Publication Data
US 2009/0224899 A1  Sep. 10, 2009

(30) Foreign Application Priority Data
Dec. 6, 2004  (EP) ................................. 04106330

(51) Int. Cl.
*B60C 23/00* (2006.01)
*B60C 23/02* (2006.01)
(52) U.S. Cl. ..................................... 340/447; 73/146.5
(58) Field of Classification Search .................. 340/445, 340/10.1
See application file for complete search history.

(56) References Cited

U.S. PATENT DOCUMENTS

| | | | |
|---|---|---|---|
| 6,087,930 A * | 7/2000 | Kulka et al. ................. 340/447 |
| 6,313,742 B1 * | 11/2001 | Larson ......................... 340/442 |
| 6,604,414 B1 * | 8/2003 | Claussen et al. .............. 73/146 |
| 7,187,273 B2 * | 3/2007 | Rieck et al. .................. 340/445 |
| 7,248,953 B2 * | 7/2007 | Ogawa ........................ 701/29 |
| 2001/0022551 A1 * | 9/2001 | Barnett ....................... 340/442 |
| 2002/0092347 A1 | 7/2002 | Niekerk et al. |
| 2002/0190853 A1 * | 12/2002 | Nigon et al. ................. 340/448 |
| 2002/0194904 A1 * | 12/2002 | Kawasaki et al. ............. 73/146 |
| 2004/0027241 A1 * | 2/2004 | Forster ....................... 340/445 |
| 2004/0154403 A1 * | 8/2004 | Petrucelli ..................... 73/753 |
| 2005/0057370 A1 * | 3/2005 | Warrior et al. ......... 340/870.01 |
| 2005/0150285 A1 * | 7/2005 | Lin ........................... 73/146.5 |

FOREIGN PATENT DOCUMENTS

| GB | 2251151 A1 | 11/1991 |
|---|---|---|
| WO | 0112453 A1 | 2/2001 |

* cited by examiner

*Primary Examiner*—Benjamin C Lee
*Assistant Examiner*—Cal Eustaquio

(57) ABSTRACT

A system comprises at least one contactless readable data carrier (1) which can be attached to a wheel (100) of a vehicle and a reader (10) which can be arranged on the vehicle to receive electromagnetic signals (ES) emitted by the data carrier (1). The reader (10) is designed to determine the revolutions of the wheel (100) from the field strength fluctuation of the received electromagnetic signals (ES), the reader (10) having calculation means (19) designed to calculate from the revolutions and a wheel periphery reference value (RU) determined by the reader and allocated to the wheel (100), such as circumference, diameter or radius, a distance covered by a point on the wheel periphery and/or values derivable therefrom such as the peripheral speed (UV) of the wheel (100).

23 Claims, 3 Drawing Sheets

| RU | BC | | |
|---|---|---|---|
| | ID | P | AB |
| RU1 | ID1 | | |
| RU2 | ID2 | | |
| RU3 | ID3 | P3 | |
| RU4 | ID3 | P4 | |
| RU5 | ID4 | P5 | |
| RU6 | ID4 | P6 | |
| RU7 | ID7 | P7 | AB7 |
| RU8 | ID7 | P7 | AB8 |
| RU9 | ID7 | P8 | AB7 |
| RU10 | ID7 | P8 | AB8 |
| ... | ... | ... | ... |
| RUx | IDx | Px | ABx |

SYSTEM, DATA CARRIERS, READER AND METHOD FOR DETERMINING THE PERIPHERAL WHEEL SPEED AND DISTANCE

FIELD OF THE INVENTION

The invention relates to a system comprising at least one contactless readable data carrier which can be mounted on the wheel of a vehicle and a reader which can be arranged on the vehicle to receive electromagnetic signals emitted by the data carrier, the reader being designed to determine the wheel revolutions from the field strength fluctuation of the electromagnetic signals received.

The invention further relates to a contactless readable data carrier for application in a wheel tire, where the data carrier has a tire pressure sensor.

The invention further relates to a reader with a receiver for receiving electromagnetic signals emitted by a contactless readable data carrier arranged on a wheel of a vehicle, the reader being designed to determine the wheel revolutions from the field strength fluctuation of the electromagnetic signals received.

The invention further relates to a method for determining a distance covered by a point on the periphery of a wheel on a vehicle, where on the wheel is mounted a contactless readable data carrier that emits electromagnetic signals, comprising the determination of a field strength fluctuation, caused by the wheel rotation, of the electromagnetic signals received at the reader, and determination of the wheel revolutions from the field strength fluctuation.

BACKGROUND OF THE INVENTION

Document WO 01/12453 A1 discloses a system and a method for monitoring at least one dynamic state of a vehicle tire, a contactless readable data carrier being mounted in the tire and a reader being arranged on the vehicle. From the fluctuations of the electromagnetic coupling between the data carrier and reader, either in the reader or in the data carrier, a dynamic state of the tire is determined such as its angular position, its rotation speed or its acceleration.

With the known system and method for monitoring at least one dynamic state of a vehicle tire however a restricted area of use has proved a disadvantage. The design of this known system clearly assumes that the reader and optionally a computer communicating with the reader for analysis of the data determined by the reader are permanently integrated in a vehicle, where to determine at least some of the dynamic states mentioned in the document the tires of this vehicle must have precisely defined and constant diameters or circumferences. This condition however is often not fulfilled for an individual vehicle since for example the diameter of summer and winter tires for a vehicle differ from each other considerably so that the known system has corresponding measurement inaccuracies. The system offers no facility for compensating for different or varying tire diameters.

OBJECT AND SUMMARY OF THE INVENTION

It is an object of the invention to propose a system according to the genus given in the first paragraph, a data carrier according to the genus given in the second paragraph, a device according to the genus given in the third paragraph and a method according to the genus given in the fourth paragraph, in which the above disadvantages are avoided.

To achieve the above-mentioned object in a system according to the invention for determining the peripheral speed of rotating wheels, features according to the invention are provided so that a system according to the invention can be characterized in the following manner, namely:

A system comprising at least one contactless readable data carrier which can be mounted on a wheel of a vehicle and a reader which can be arranged on the vehicle for receiving electromagnetic signals emitted by the data carrier, the reader being designed to determine the wheel revolutions from the field strength fluctuations of the electromagnetic signals received, where the reader has calculation means designed to calculate, from the revolutions and a wheel periphery reference size that is allocated to the wheel and can be determined by the reader such as the circumference, diameter or radius, a distance covered by a point on the wheel periphery and/or values derivable therefrom such as the peripheral speed of the wheel.

To achieve the above-mentioned object in a data carrier according to the invention to determine the peripheral speed of rotating wheels, features according to the invention are provided so that a data carrier according to the invention can be characterized in the following manner, namely:

A contactless readable data carrier for mounting in a wheel tire, where the data carrier has a tire pressure sensor and furthermore in the data carrier in a non-volatile memory is stored a table which contains the allocations of tire pressures to effective wheel periphery reference values such as circumference, diameter or radius, and the data carrier is designed to determine, using the table, from a tire pressure measured by the tire pressure sensor, the associated effective wheel periphery reference value and emit this as an electromagnetic signal.

To achieve the above-mentioned object in a reader according to the invention for determining the peripheral speed of rotating wheels, features according to the invention are provided so that a reader according to the invention can be characterized in the following manner, namely:

A reader with a receiver for receiving electromagnetic signals emitted by a contactless readable data carrier attached to a wheel of a vehicle, the reader being designed to determine the wheel revolutions from a field strength fluctuation of the electromagnetic signals received, where the reader has calculation means designed to calculate, from the revolutions and a wheel periphery reference value allocated to the wheel and which can be determined by the reader such as circumference, diameter or radius, a distance covered by a point on the wheel periphery and/or values derivable therefrom such as the peripheral speed of the wheel.

To achieve the above-mentioned object in a method according to the invention for determining the peripheral speed of rotating wheels, features according to the invention are provided so that a method according to the invention can be characterized in the following manner, namely:

A method for determining a distance covered by a point on the periphery of a wheel of a vehicle, where on the wheel is attached a contactless readable data carrier that emits electromagnetic signals, comprising the determination of a field strength fluctuation, caused by the wheel rotation, of the electromagnetic signals received by the reader, determination of the wheel revolutions from the field strength fluctuation, determination of a wheel periphery reference value allocated to the wheel such as circumference, diameter or radius, and from the revolutions and the wheel periphery reference value calculation of a distance covered by a point on the wheel periphery and/or values derivable therefrom such as the peripheral speed of the wheel.

The features according to the invention achieve that in a simple manner an adaptation is possible to modified conditions such as different wheels, varying air pressure in the wheel tires and the associated change in wheel circumference etc. Individual wheels on the vehicle can have different diameters and these different diameters are also taken into account individually according to the invention. With the features according to the invention it is also possible to use a reader alternately on several vehicles, for example as a speedometer on different bicycles. Furthermore changes to the wheels can also be recorded or written back to the contactless data carriers in the wheels. The system according to the invention is largely insensitive to wheel soiling.

In an embodiment of the invention the data carrier is designed to emit a wheel periphery reference value of the allocated wheel as an electromagnetic signal, and the reader is designed to extract the wheel periphery reference value from the electromagnetic signals received from the data carrier and present this to the calculation means. These measures give the advantage that the correct wheel periphery reference value is always available to the calculation means in the reader. On any wheel change which could lead to a change in wheel periphery reference value, the calculation means can immediately use the updated wheel periphery reference value without the intervention of an operator, whereby correct calculations of the distance covered by a point on the wheel periphery and/or the peripheral speed are guaranteed.

Advantageously the reader has a data memory communicating with the calculation means for storing at least one wheel periphery reference value and where applicable the reference codes allocated to the wheel periphery reference values. By these measures in the reader a table can be created with wheel periphery reference values which substantially simplifies the use of the reader in particular if the reader is to be operated on several vehicles. Such a table need usually only be created once on first commissioning of the reader. In the simplest case, if namely the peripheral speed or distance covered by a point on the wheel periphery or similar is to be calculated only for one particular wheel type, it suffices if the data carrier has only memory space for a single wheel periphery reference value, the calculation means accessing this memory space and reading the wheel periphery reference value from this to calculate the peripheral speed. On a change of wheel periphery reference value the memory space in the data memory must be written with new values. It is however preferred for simplified handling that the data carrier offers memory space for the creation of a table containing a multiplicity of wheel periphery reference values and reference codes linked with these wheel periphery reference values. In one embodiment of the invention the reference codes comprise unique data carrier identification codes to give a 1:1 allocation between wheel periphery reference value and the identification code. The wheels of a particular type are fitted with contactless readable data carriers which transfer to the reader an identification code characterizing this wheel type. In the table the corresponding wheel periphery reference value is allocated to this identification code so that the calculation means can determine the associated reference value from knowledge of the identification code and use this value to calculate the peripheral speed or distance.

In a further refinement of the invention the reference code comprises physical values of the wheel such as the pressure of a tire on the wheel. The effective diameter of the wheel changes with the tire pressure, in other words fluctuations in tire pressure lead to deviations of the tire from the standard diameter which only applies for a precisely specified tire pressure. In this embodiment of the invention it is provided that the contactless readable data carrier has a tire pressure sensor which determines the tire pressure of the allocated wheel and sends this to the reader. In addition an identification code can also be sent. The table in the data carrier of the reader in this embodiment of the invention is constructed so that it has a multiplicity of wheel periphery reference values which each correspond to a particular tire pressure value (or tire pressure range). If the contactless readable data carrier also sends identification codes, the table can be constructed three-dimensionally, i.e. for each identification code (which corresponds to a particular wheel type) there are a multiplicity of wheel periphery reference values which again are dependent on tire pressure.

The reader according to the invention can be factory-fitted with corresponding tables stored in non-volatile data memories. According to the invention however it is also proposed to provide in the reader a user interface with which the table data can be created manually by the user (e.g. by means of keys) or downloaded from a server via a data transmission connection etc. The user interface can also be designed for the plug connection of memory modules containing prestored tables. Such memory modules can for example be provided by the wheel manufacturers and release the user from the need for manual input.

In an advantageous embodiment of the invention the reader is designed to send to the data carrier data derivable from the determined distance covered by a point on the wheel periphery or from the wheel peripheral speed, such as distance traveled, operating hours, average speed etc. The data carrier comprises a non-volatile memory for the storage of data received by the reader. In this way these data remain stored in the data carrier independently of the reader so that on exchange of the reader the data are available for the next reader, in that it retrieves these from the data carrier and provides these to the calculation means in the reader as a basis for calculations.

It is known that the diameter of a wheel reduces over life as a function of tire wear. To allow as precise as possible a calculation of the distance covered by a point on the wheel periphery or the peripheral speed of the tire, it is necessary also to include tire wear in the conversion of revolutions to peripheral speed. This can be achieved using tables which are stored in the reader or the contactless readable data carrier and which contain the distance covered or the operating hours of a tire in relation to its tire wear or the resulting change in wheel diameter. Advantageously tire wear can be used as a reference code allocated to a wheel periphery reference value in the same way as and where applicable in addition to the above-mentioned tire pressure.

It should be mentioned that to calculate the effective diameter as a function of pressure, wear, wheel load etc., functions (e.g. linear) equivalent to tables can be used.

The wheel load of a vehicle also affects the effective diameter of the tires. To increase the precision of calculation of the distance covered by a point on the wheel periphery or the peripheral speed of a tire therefore, in a refinement of the invention it is proposed to connect the reader in a communication connection with a wheel load sensor which senses the wheel load caused by the weight of the vehicle and its load and transfers this to the calculation means of the reader. The calculation means send the received wheel load to the data carrier in the wheel and/or calculate the deformation of the wheel caused by the wheel load or the associated change in effective wheel diameter and use the effective wheel diameter determined as a basis for the calculation of the distance covered by a point on the wheel periphery or wheel peripheral speed.

It should be stated that the effective diameter can be calculated as a function of pressure, wear, wheel load etc. not only via tables but also via equivalent functions processed by the calculation means (e.g. a linear function).

In a particularly preferred embodiment of the invention, the reader is integrated in a mobile telephone. Mobile telephones with integral NFC (near field communication) interfaces are already available on the market which can communicate with contactless readable data carriers. Such mobile telephones can also serve as readers according to the invention without requiring a change in hardware. Merely the operating system of the mobile phone must be supplemented accordingly so that the necessary functions are available. This allows a low cost market launch of the invention which would meet with broad acceptance by consumers as they can continue to use their existing mobile phones and merely require a firmware update. A particularly preferred area of application of the reader integrated in the mobile phone is use as a speedometer on a bicycle. Here the mobile phone can be inserted in a holder attached to the handlebars of the cycle and communicate with a contactless readable data carrier attached to the front wheel in order to give the cyclist the momentary speed, the distance covered and other parameters derivable from the cycle speed such as average speed, duration of trip, rest times etc. and where applicable save these temporarily for later use (e.g. analysis on a computer).

These and other aspects of the invention are apparent from and will be elucidated with reference to the embodiments described hereinafter, to which the invention is not however restricted.

BRIEF DESCRIPTION OF THE DRAWINGS

In the drawings:

FIG. 4 shows a table stored in the data memory of the reader.

DESCRIPTION OF EMBODIMENTS

Figure 1:
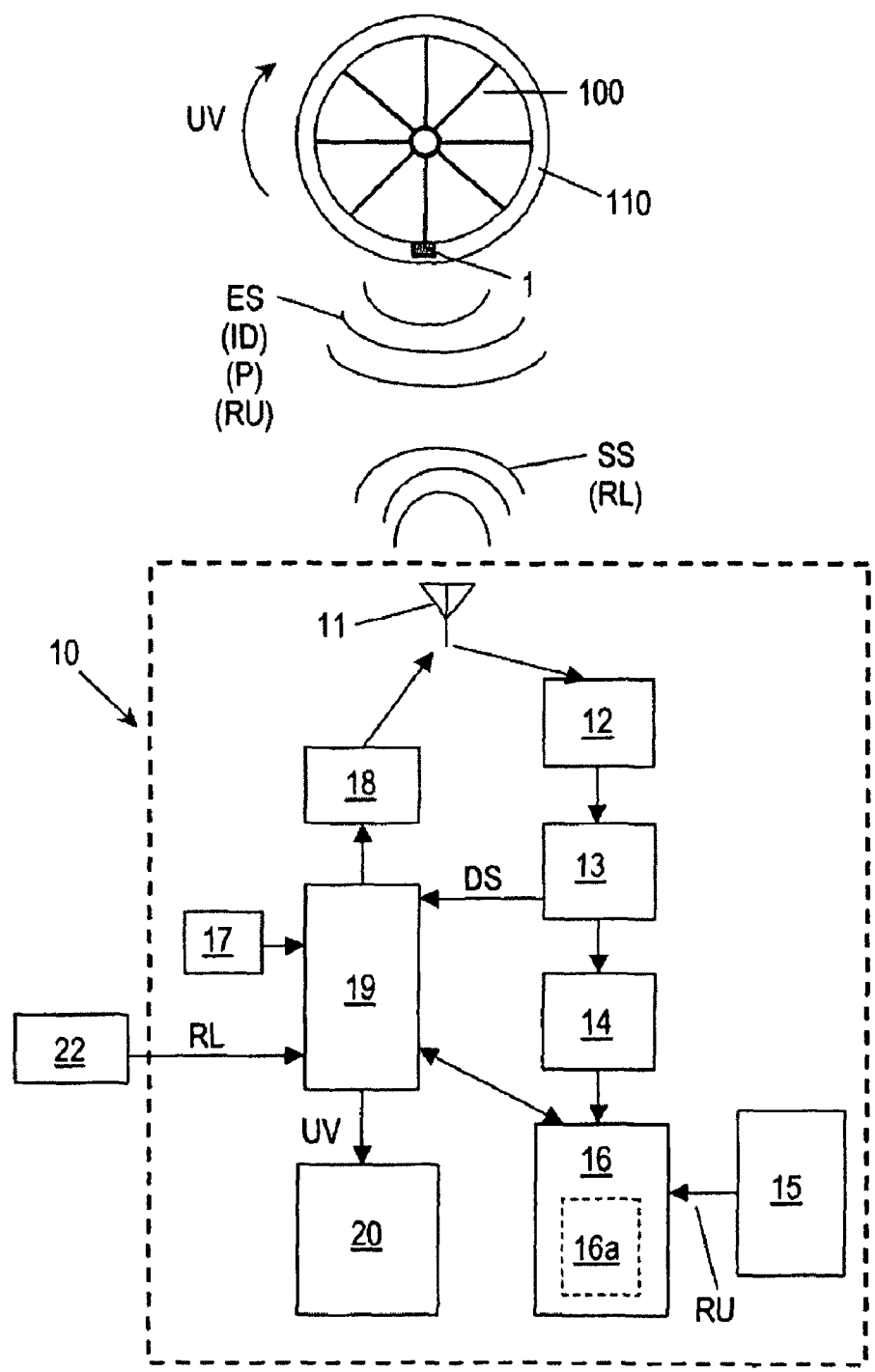
FIG. 1 shows a block circuit diagram of a system according to the invention with which the peripheral speed of rotating vehicle wheels or the distance covered by a point on the periphery of a wheel etc. can be determined.

FIG. 1 shows in a block circuit diagram an embodiment example of a system according to the invention with which the peripheral speed of rotating vehicle wheels or the distance covered by a point on the periphery of a wheel etc. can be determined. The system comprises a contactless readable data carrier 1 which can be attached on or in a tire 110 of a wheel 100 of a vehicle not shown. The wheel 100 can rotate, the wheel periphery speed occurring at the circumference of the tire 110 is indicated with the arrow UV. The data carrier 1 is formed as a so-called RFID (radio frequency identification) data carrier. The vehicle can be a bicycle, a two-wheeled or four-wheeled motor vehicle or similar. The data carrier 1 emits electromagnetic signals ES containing data which will be discussed further below. The system further comprises a reader 10 designed to receive the electromagnetic signals ES emitted by the contactless readable data carrier 1. To this end the reader 10 has an antenna 11 and a receiver 12. For example the reader 10 is formed as an NFC (near field communication) device according to standards ISO 14.443 and ISO 15.693 and has a restricted range from a few centimeters to a few tens of centimeters. The data carrier 1 can advantageously be formed as a passive data carrier which does not have its own power supply but is supplied by the reader 10 or by a permanent magnet through electromagnetic coupling. For supply by a permanent magnet it is also possible to attach the permanent magnet to the rotating wheel and attach the data carrier statically to the vehicle close to the rotating wheel. The data carrier would then only emit signals when the permanent magnet in its revolution on the wheel passes the data carrier. If the data carrier 1 is an active data carrier supplied with power from a battery, it is favorable if a tilt switch, centrifugal switch or similar is provided to interrupt the power supply when the wheel has stopped.

Figure 3:
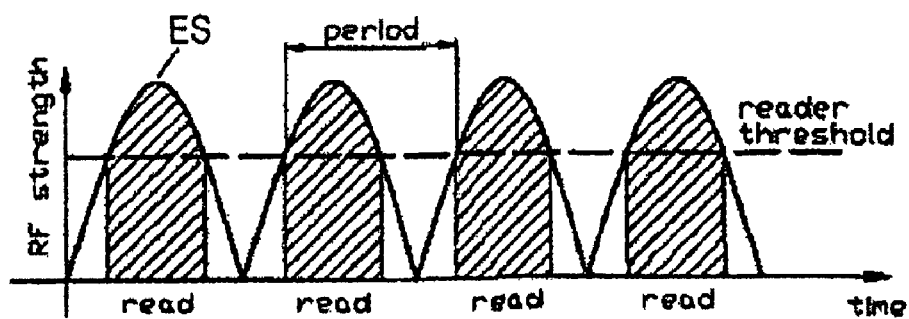
FIG. 3 shows a time diagram indicating the periodic field strength fluctuations of the electromagnetic signals which are received at the reader and emitted by the contactless readable data carrier attached to a wheel, as a function of wheel speed.

The transmission power of the data carrier 1 is low so that on rotation of the wheel 100 and the resulting varying distance between the data carrier 1 rotating with the wheel 100 and the stationary reader 10, periodic fluctuations occur in the electromagnetic field strength of the electromagnetic signals ES occurring at the antenna 11 of the reader 10. FIG. 3 shows the field strength (RF strength) of the electromagnetic signals ES occurring at the antenna 11 over time. So that the data contained in the electromagnetic signals ES can be read in the reader 10, a minimum field strength is required which is indicated in the diagram in FIG. 3 as a "reader threshold". In the reader 10 is provided a threshold value discriminator 13 which detects when the electromagnetic signal ES received passes its reader threshold, and on passing the threshold with detection sends a detection signal DS to the calculation means 19. The passing of this threshold occurs at a particular proximity of the data carrier 1 to the reader 10 and marks the start of the period of a revolution of the wheel 100. From this time in the reader 10 it is also possible to read out via data read means 14 the data from the electromagnetic signals ES at least as long as this field strength remains above the reader threshold as indicated by the hatched areas in the diagram in FIG. 3. It should be stated that the field strength fluctuations occur not only because of the rotation of the wheel and the associated changing distance between data carrier 1 and reader 10, but also due to modulation of the electromagnetic signal ES for data transmission. These modulations are of substantially higher frequency than the rotation speed of the wheel. The field strength fluctuations provoked by the wheel revolutions are thus regarded as the envelope of the modulated electromagnetic signal ES, which envelope can be measured by low pass filtration. The calculation means 19 of the reader 10 are connected with a clock generator 17 and determine the duration of the period of the wheel revolution as the temporal difference between the reception of two successive detection signals DS. Instead of the amplitude fluctuations of the electromagnetic signals ES the threshold discriminator 13 can also detect the phase fluctuations in the electromagnetic signal ES due to the rotation of the wheel 100. Alternatively the periods of a wheel revolution can be determined from the times at which in each case the data read means 14 have completed the reading of the data from the electromagnetic signal ES, as it can be assumed that the processing time required by the data read means 14 between the start of the reading and the presence of the data remains constant or can be regarded as negligibly small in comparison with the length of the period. The data read means 14 write the data they determine to a data memory 16.

As stated the calculation means 19 determine the periods of revolution of the wheel 100. By reciprocal value formation of the periods and multiplication with a time reference, the calculation means 19 calculate the rotation speed of the wheel 100 from the determined periods. According to the invention the calculation means 19 are also designed to calculate from the revolutions or calculated speed a distance covered by a point on the wheel periphery and/or values derivable therefrom such as the peripheral speed UV of the wheel. For this the calculation means 19 require a wheel periphery reference value RU such as the circumference, diameter or radius of the wheel 100. This wheel periphery reference value RU is stored in the data memory 16, where in one embodiment of the invention the wheel periphery reference value RU can be supplied either directly by the data carrier 1 as it sends the corresponding data coded in electromagnetic signals ES to the reader 10 where they are extracted by the data read means 14 and written to the data memory 16. Alternatively the reader 10 has a user interface 15 for input of the wheel periphery reference value RU and storage in the data carrier 16. The user interface 15 can have keys by means of which a user can make the necessary inputs. The user interface 15 can however also be designed for downloading the wheel periphery reference value RU via a data network such as the internet. Again in an alternative embodiment the user interface 15 comprises a connector e.g. a plug connector, for connection to a memory card on which is stored the wheel periphery reference value RU. By access to the data memory 16 the calculation means 19 retrieve the wheel periphery reference value RU and are thus able to calculate by multiplication operations from the rotation speed and wheel periphery reference value RU, the peripheral speed UV of the wheel and/or a distance covered by a point on the wheel periphery. Conversion is simplest if the wheel periphery reference value RU is present as the wheel circumference. For the case where the wheel periphery reference value RU is present as the radius or the diameter of the wheel 100, the calculation means 19 first carry out a multiplication with $2\pi$ or $\pi$ in order to obtain the wheel circumference. The calculated peripheral speed UV of the wheel 100 or distance covered etc. is indicated by the calculation means 19 on a display 20.

It should be stated that only in the basic design of the invention is merely the wheel periphery reference value RU stored in the data memory 16 of the reader 10. The reader 10 is in this case designed only to calculate the peripheral speed of a particular wheel type. Each time the reader 10 must measure the peripheral speed of a different wheel type which has a different wheel circumference, the wheel periphery reference value RU must be reset in the data memory 16. This can be done automatically if a data carrier 1 allocated to the new wheel type automatically sends the corresponding wheel periphery reference value RU to the reader 10 so that the user need not perform any adjustments. If the data carrier 1 of the new wheel does not send a wheel periphery reference value RU, the user on each wheel type change must manually enter the modified wheel periphery reference value RU via the user interface 15. If for example a user would like to use the reader 10 as a speedometer on various bicycles e.g. a mountain bike and a racing bike, this adjustment work is associated with inconvenience for him (and the risk of incorrect inputs). This is not desirable and therefore the invention in a refined embodiment provides measures which make the adjustment work for the user very simple or totally superfluous. According to these measures the data memory 16 is designed to store several wheel periphery reference values RU1, RU2, RUx and their allocated reference codes BC in the form of a table 16a. This table 16a is shown in detail in FIG. 4. The first column of this table 16a contains the wheel periphery reference value RU. From the second column of the table, the reference codes BC allocated to these are shown. These reference codes BC can firstly be identification codes ID of the data carrier 10 which are unique for a specific wheel or at least a specific wheel type. The reference codes BC can secondly also be physical values characteristic of the wheels such as a tire pressure P or a tire wear AB which can also be expressed as a distance covered or operating hours. With this design of the table 16a for example the user of a mountain bike and a racing bike can have two contactless readable data carriers 1 with different identification codes ID1, ID2 and attach one to a wheel 100 of each cycle. On first commissioning of the reader 10 the user, via the user interface 15, programs the wheel periphery reference values RU1 and RU2 of the wheels 100 of both cycles and the associated identification codes ID1, ID2 of the data carriers 1 attached to the wheels 100. From now on he can use the reader 10 as a speedometer arbitrarily on both cycles without having to reprogram the reader 10. Advantageously the reader 10 is integrated in a mobile phone, where mobile telephones are already available on the market which have an NFC interface that can function as a receiver 12 so that with such mobile phones it is merely necessary to supplement the operating system in order to provide the functionality of a reader 10, but no hardware supplement is required. The cyclist attaches his mobile phone with the functions of a reader in a holder on the handlebars of his cycle and during the ride the mobile phone via its NFC interface receives the signals ES from a data carrier 1 attached to the front tire of his bicycle, where the reception sensitivity of the NFC interface and the transmission range of the data carrier 1 are matched to each other so that the NFC interface on rotation of the wheel and data carrier 1 attached thereto can establish a clear fluctuation in the reception field strength of the electromagnetic signals ES, or the NFC interface receives signals ES from data carrier 1 only when this is close to its minimum distance from the mobile phone on its revolution.

As stated reference codes BC can also be physical values of the wheels, such as tire pressure P. The tire pressure P is important since on fluctuations of the tire pressure the effective wheel diameter deviates from a nominal diameter which applies only to a precisely specified tire pressure. To increase the accuracy of the peripheral speed calculation by the calculation means 19 therefore the tire pressure should be included in the calculation. This is achieved in that table 16a contains, for each wheel, several wheel peripheral reference values which depend on tire pressure. In the actual example for wheels to which identification codes ID3 and ID4 are allocated, these are the wheel periphery reference values RU3, RU4, RU5, RU6 which depend on tire pressure values P3, P4, P5, P6 (or tire pressure value ranges). The readers 10 can be factory-fitted with corresponding tables 16a. In this embodiment of the invention it is provided that the contactless readable data carrier 1 has a tire pressure sensor 2 (see FIG. 2) with which the tire pressure P of the allocated wheel 100 can be determined and sent to the reader 10. In addition to this an identification code ID can also be sent.

Furthermore the calculation means 19 are designed to determine from the calculated peripheral speed UV of the wheel 100 statistical data derivable therefrom such as distance traveled, operating hours, average speed, and store these, where these data are preferably sent via a transmitter 18 as electromagnetic signals SS to the data carrier 1 which has a non-volatile memory 3 for storage of these data. Thus the data remain stored in the data carrier 1 independently of the reader 10 so that even on exchange of reader 10 the data are available unchanged to the new reader and can serve as a basis for calculations by its calculation means 19.

It is further known that the diameter of a tire 110 reduces as a function of tire wear over its life, leading to a slowly increasing error in calculation of the peripheral speed UV. In order to allow as precise as possible a calculation of peripheral speed UV or distance covered by a point on the wheel periphery over the total tire life 110, it is necessary to include the tire wear in the conversion of wheel revolutions into the said values. To this end the table 16a (see FIG. 4), for a wheel with identification code ID7 contains the tire wear values AB7, AB8 as reference codes. The tire wear values AB7, AB8 can be set either as diameter correction values as a function of distance traveled or life, or as distance values or life values, in which case the calculation means 19 contain functions for calculating a diameter correction value from the distance traveled or life. Preferably for the wheel with the allocated identification code ID7 in addition to the tire wear AB7, AB8, the tire pressure P7, P8 is also included in the calculation of peripheral speed.

Also the wheel load of a vehicle affects the actual diameter of the tires. To increase the accuracy of calculation of the peripheral speed of the tire 110, the reader 10 has a wheel load sensor 22 (or is in communication connection with a wheel load sensor 22). The wheel load sensor 22 senses the wheel load caused by the weight of the vehicle and its load and transmits the wheel load values RL to the calculation means 19 of the reader 10. The calculation means 19 calculate the deformation of the tire 110 caused by the wheel load RL or the associated change in effective wheel diameter and use the effective wheel diameter determined to calculate the wheel peripheral speed. It is further provided that the calculation means 19 pass on the received wheel load RL via the transmitter 18 to the data carrier 1.

Figure 2:
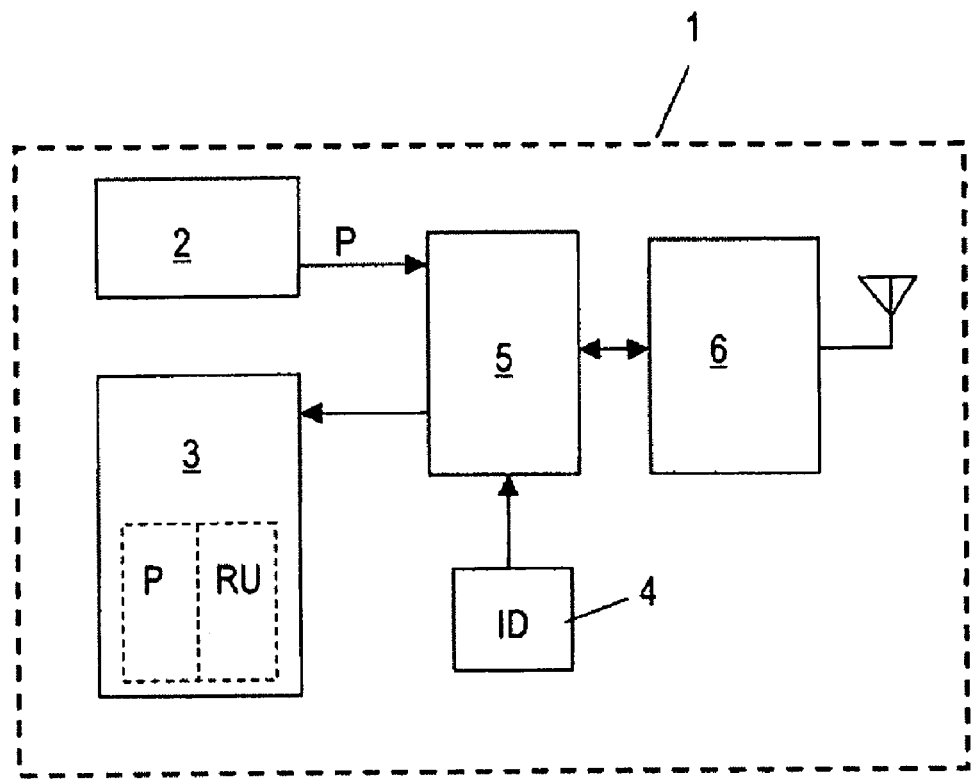
FIG. 2 shows a diagrammatic view of a contactless readable data carrier according to the invention.

FIG. 2 shows a contactless readable data carrier 1 according to the invention in a block circuit diagram. The data carrier 1 has a controller 5 which controls all processes in the data carrier 1. Furthermore the data carrier 1 has a pressure sensor 2 which measures the tire pressure P of a tire in which the data carrier 1 is integrated and communicates the measured tire pressure value P to the controller 5 which transmits this via a transmitter/receiver 6 to a reader. The controller 5 furthermore continuously or at regular time intervals transmits a unique identification code ID via the transmitter/receiver 6. Finally the data carrier 1 has a non-volatile memory 3 in which data received from the reader such as operating hours, distance traveled etc. are permanently stored and can be retrieved by a reader. It should also be stated that the data carrier 1 can be refined so that the controller 5 taking into account tire pressure can calculate a wheel periphery reference value RU or corresponding comparison tables are stored in the non-volatile memory 3, and the controller sends these wheel periphery reference values RU (where applicable together with the identification code ID) to the reader 10. Instead of comparison tables the wheel periphery reference value RU can also be calculated by the use of mathematical functions in the controller 5.

It should also be stated that the distance covered by a point on the wheel periphery should be structured such that this distance is related to a co-ordinate system related to the wheel axis and hence relates to the wheel circumference which corresponds to the distance covered by the vehicle.

The invention claimed is:

1. A system comprising:
   a data carrier that is mounted on a wheel of a vehicle and emits an electromagnetic signal;
   a reader that receives the electromagnetic signal emitted by the data carrier, the reader determining the wheel revolutions of the vehicle from the field strength fluctuations of the received electromagnetic signal, wherein the reader further comprises:
   a threshold value discriminator that produces a detection signal whenever a field strength of the received electromagnetic signal exceeds a threshold; and
   a calculation means that determines a duration of a period of the wheel revolutions based on a temporal difference between the reception of two successive detection signals, and calculates, from the revolutions and a wheel periphery reference value that is allocated to the wheel comprising a wheel circumference, diameter or radius, a distance covered by a point on the wheel periphery and a peripheral speed of the wheel;
   wherein the data carrier sends said wheel periphery reference value in the electromagnetic signal, the reader extracts the wheel periphery reference value from the received electromagnetic signal and provides the extracted value to the calculation means.

2. The system of claim 1, wherein the reader further comprises:
   a data memory communicating with the calculation means to store at least one wheel periphery reference value and reference codes allocated to the at least one wheel periphery reference value.

3. The system of claim 2, wherein the reader further comprises:
   a user interface for input of the at least one wheel periphery reference value and the reference codes for storage in the data memory.

4. The system of claim 2, wherein the reference codes comprise unique identification codes of the data carrier.

5. The system of claim 3, wherein the reference codes comprise pressure values and the data carrier determines tire pressure of an associated tire and sends the determined tire pressure as the reference code to the reader.

6. The system of claim 1, wherein the reader sends to the data carrier data derivable from a distance covered by a point on a wheel periphery or a peripheral speed of the wheel.

7. The system of claim 6, wherein the reader determines a distance traveled from the distance covered by the point on the wheel periphery or the peripheral speed of the wheel, and determines tire wear from the distance traveled, and stores the determined tire wear in the data memory.

8. The system of claim 1, wherein the reader communicates with a wheel load sensor which senses a wheel load caused by a weight of the vehicle and its load, the calculation means of the reader sends the sensed wheel load to the data carrier, and calculates from a deformation of the wheel caused by the wheel load an associated change in effective wheel diameter, while taking into account a distance covered by a point on a wheel periphery or a peripheral speed of the wheel.

9. The system of claim 1, wherein the reader is integrated in a mobile phone.

10. A contactless readable data carrier mounted on a tire of a wheel, wherein the data carrier comprises:
    a tire pressure sensor that measures a pressure of the tire;
    a non-volatile memory that stores a table comprising allocations of tire pressures to wheel periphery reference values comprising a wheel circumference, diameter, or radius; and
    a controller that transmits the measured pressure and the wheel periphery reference values as an electromagnetic signal to a reader, wherein the reader produces a detection signal whenever a field strength of the electromagnetic signal exceeds a threshold and determines a period of revolution of the wheel based on a temporal difference between reception of two successive detection signals;

wherein the reader calculates the peripheral speed of the wheel based on the wheel periphery reference value corresponding to the measured tire pressure and the period of revolution.

11. A reader that receives electromagnetic signals emitted by a contactless readable data carrier attached to a wheel of a vehicle, the data carrier storing a wheel periphery reference value comprising a wheel circumference, diameter or radius, the reader determining revolutions of the wheel from a field strength fluctuation of the received electromagnetic signals, wherein the reader comprises:
- a threshold value discriminator that produces a detection signal whenever a field strength of the received electromagnetic signals exceeds a threshold; and,
- a calculation means that determines a duration of a period of the wheel revolutions based on a temporal difference between reception of two successive detection signals; and
- a data read means which extract a wheel periphery reference value from the received electromagnetic signals and present the extracted wheel periphery reference value to the calculation means;
- wherein the calculation means calculates, from the revolutions, the duration and the extracted wheel periphery reference value, a distance covered by a point on the wheel periphery and the peripheral speed of the wheel.

12. The reader of claim 11, further comprising:
- a data memory communicating with the calculation means to store at least one wheel periphery reference value and reference codes allocated to the at least one wheel periphery reference value.

13. The reader of claim 12, further comprising:
- a user interface receiving input of the at least one wheel periphery reference value and the reference codes and storing the received input in the data memory.

14. The reader of claim 12, wherein the reference codes comprise:
- one or more unique identification codes of the contactless readable data carrier, tire pressure values, and wear values.

15. The reader of claim 11, wherein the calculation means sends to the contactless readable data carrier data derivable from a distance covered by a point on a wheel periphery or a peripheral speed of the wheel.

16. The reader of claim 15, wherein the calculation means determines a distance traveled from the distance covered by the point on the wheel periphery or the peripheral speed of the wheel, determines tire wear from the distance traveled, and stores the determined tire wear in the contactless readable data carrier.

17. The reader of claim 11, further comprising:
- a wheel load sensor that senses a wheel load caused by a weight of the vehicle and its load and transmits the sensed wheel load to the calculation means, wherein the calculation means sends the transmitted wheel load to a data carrier and calculates from a deformation of the wheel caused by the wheel load an associated change in an effective wheel diameter, while taking into account in a distance covered by a point on a wheel periphery or a peripheral speed of the wheel.

18. The reader of claim 11, wherein the reader is integrated in a mobile telephone.

19. A method for determining a distance covered by a point on a periphery of a wheel of a vehicle and a peripheral speed of a wheel, the method comprising:
- attaching a contactless readable data carrier to the wheel, wherein the contactless readable data carrier emits electromagnetic signals;
- receiving the emitted electromagnetic signals with a reader;
- determining, with the reader, a field strength fluctuation, caused by rotation of the wheel, in the received electromagnetic signals;
- determining, with the reader, revolutions of the wheel by using the determined field strength fluctuation;
- determining, with the reader, a wheel periphery reference value allocated to the wheel, comprising a wheel circumference, diameter, or radius;
- producing, with the reader, a detection signal whenever a field strength of the received electromagnetic signals exceeds a threshold;
- determining, with the reader, a duration of a period of wheel revolutions based on a temporal difference between reception of two successive detection signals; and
- from the revolutions, the duration, and the wheel periphery reference value, calculating the distance covered by a point on the wheel periphery and the peripheral speed of the wheel.

20. The method of claim 19, further comprising:
- emitting, with the contactless readable data carrier, a wheel periphery reference value of the wheel in the electromagnetic signals.

21. The method of claim 19, further comprising:
- storing, with the reader, at least one wheel peripheral reference value and a reference code allocated to the wheel.

22. The method of claim 21, wherein the reference code comprises a unique identification code of the contactless readable data carrier.

23. The method of claim 19, further comprising:
- sensing, with a wheel load sensor in the reader, a wheel load caused by a weight of the vehicle and its load; and
- calculating, with the reader, an associated change in effective wheel diameter based on a deformation of the wheel caused by the wheel load, while taking into account a distance covered by a point on the wheel periphery and a peripheral speed of the wheel.

* * * * *